US011653623B2

(12) United States Patent
Rybczynski

(10) Patent No.: US 11,653,623 B2
(45) Date of Patent: May 23, 2023

(54) CONTROL SYSTEM FOR A ROTARY MILKING PARLOR AND METHOD OF CONTROLLING A ROTARY MILKING PARLOR

(71) Applicant: DELAVAL HOLDING AB, Tumba (SE)

(72) Inventor: Krzysztof Rybczynski, Tumba (SE)

(73) Assignee: DeLaval Holding AB, Tumba (SE)

( * ) Notice: Subject to any disclaimer, the term of this patent is extended or adjusted under 35 U.S.C. 154(b) by 501 days.

(21) Appl. No.: 16/620,295

(22) PCT Filed: Jun. 5, 2018

(86) PCT No.: PCT/SE2018/050580
§ 371 (c)(1),
(2) Date: Dec. 6, 2019

(87) PCT Pub. No.: WO2018/226144
PCT Pub. Date: Dec. 13, 2018

(65) Prior Publication Data
US 2020/0205373 A1 Jul. 2, 2020

(30) Foreign Application Priority Data
Jun. 7, 2017 (SE) .................................... 1750719-5

(51) Int. Cl.
*A01K 1/12* (2006.01)

(52) U.S. Cl.
CPC .................................... *A01K 1/126* (2013.01)

(58) Field of Classification Search
CPC .............................. A01K 1/123; A01K 1/126
See application file for complete search history.

(56) References Cited

U.S. PATENT DOCUMENTS 5,680,124 A * 10/1997 Bedell ................ B64D 45/0005
324/207.13
9,222,533 B2 * 12/2015 Obermuller ............. F16D 63/00
(Continued)

FOREIGN PATENT DOCUMENTS

WO  2010/139602 A1  12/2010
WO  2011/022026 A1  2/2011
(Continued)

OTHER PUBLICATIONS

International Search Report and Written Opinion, dated Sep. 27, 2018, from corresponding PCT application No. PCT/SE2018/050580.
(Continued)

*Primary Examiner* — Magdalena Topolski
(74) *Attorney, Agent, or Firm* — Nixon & Vanderhye

(57) ABSTRACT

A rotary milking parlor controlled that uses a set of sensors generating sensor signals that determine whether or not an entity is located at a hazardous position of the rotary milking parlor, and a central control unit, where each sensor in the set of sensors generates first and second independent signals, the first and second signals conveyed separately via respective first and second signal lines to the central control unit, and the rotary milking parlor controlled to be operated only if both the first and second signals of all sensors in the set of sensors indicate that no entity is deemed to be located at a hazardous position.

11 Claims, 3 Drawing Sheets

(56) References Cited

U.S. PATENT DOCUMENTS

| | | | |
|---|---|---|---|
| 10,104,863 B1* | 10/2018 | Henry | B25J 15/04 |
| 2004/0085184 A1 | 5/2004 | Sigmund | |
| 2010/0126421 A1 | 5/2010 | Nahues et al. | |
| 2010/0324733 A1 | 12/2010 | Bischoff et al. | |
| 2011/0308465 A1* | 12/2011 | Siddell | A01K 1/12 |
| | | | 119/14.03 |
| 2011/0308466 A1* | 12/2011 | Esch | A01K 1/126 |
| | | | 119/14.04 |
| 2011/0308468 A1 | 12/2011 | Esch et al. | |
| 2012/0006269 A1* | 1/2012 | McCain | B25J 9/1612 |
| | | | 119/14.02 |
| 2012/0132142 A1* | 5/2012 | Holmgren | A01K 1/126 |
| | | | 119/14.08 |
| 2012/0200674 A1* | 8/2012 | Hofman | A01K 1/126 |
| | | | 382/110 |
| 2012/0210938 A1* | 8/2012 | Hofman | A01J 5/017 |
| | | | 119/14.02 |
| 2013/0263787 A1 | 10/2013 | Nyberg | |
| 2020/0383296 A1* | 12/2020 | Umegard | G08C 17/02 |
| 2022/0061260 A1* | 3/2022 | Gross | A01K 5/02 |

FOREIGN PATENT DOCUMENTS

| | | |
|---|---|---|
| WO | 2012/033445 A2 | 3/2012 |
| WO | 2012/091666 A1 | 7/2012 |
| WO | 2013/089628 A1 | 6/2013 |

OTHER PUBLICATIONS

SE Search Report, dated Feb. 6, 2018, from corresponding SE application No. 1750719-5.

* cited by examiner

//  CONTROL SYSTEM FOR A ROTARY MILKING PARLOR AND METHOD OF CONTROLLING A ROTARY MILKING PARLOR

TECHNICAL FIELD

The present invention relates generally to safety solutions for rotary milking parlors. More particularly the invention relates to a control system according to the preamble of claim 1 and a corresponding method. The invention also relates to a computer program and a non-volatile data carrier.

BACKGROUND

When using a rotary milking parlor, the cows stand on a circular raised platform. This allows the farmer to attach the milking machine in a convenient manner. The platform rotates comparatively slowly, allowing cows to enter and exit the platform as the platform rotates. Nevertheless, milking in a rotary parlor is typically requiring less labor than in alternative designs, such as herringbone parlors, especially for large farms with big herds. A rotary milking parlor is beneficial because it is possible to personalize the rotation speed and direction to suit the farmer and his/her herd. However, inter alia due to the mere fact that the rotary milking parlor involves movement of a very large and heavy object (i.e. the platform with animals); certain safety aspects must be taken into account.

WO 2013/089628 describes a rotary parlor arranged to house animals to be milked. The parlor has an annular rotary platform, where at least one milking stall is defined by at least one side wall element and a storing device is adapted to hold teat cups in a parking position. The rotary parlor also includes restricting means adapted to restrict the mobility of the animal in the milking stall in such a manner that a free space is created between the animal and a side wall element in a part of the milking stall. The free space is used by a robot arm when it fetches a teat cup in the storing device and attaches it to a teat of the animal in the milking stall.

US 2010/0126421 shows a safety switching device for a milking carousel with a rotatably driven milking platform with a multiple number of milking stations. Here, a milking machine is arranged at each milking station. At least one stationary, non-rotating animal passageway, as well as a gap are arranged between the rotatable milking platform and the animal passageway. The safety switching device has a movable switching paddle, as well as signaling device arranged or formed on the switching paddle for triggering an alarm function. The switching paddle is designed and mounted in such a way that the distance to the outside peripheral edge increases toward a free end.

US 2011/0308468 discloses a system including a milking parlor entrance lane with an entrance positioned adjacent to a cattle holding pen and an exit positioned adjacent to one or more stalls of a rotary milking platform. The system also includes an exit lane positioned on a side of the entrance lane opposite a forward direction of rotation of the rotary milking platform. The milking parlor exit lane positioned adjacent to one or more stalls of a rotary milking platform such that dairy cows may enter the exit lane from the one or more stalls of the rotary milking platform after being milked. The system also includes a pressure sensor positioned adjacent to the exit lane. The pressure sensor is operable to generate a trigger in response to detecting a triggering pressure on the pressure sensor. The pressure sensor is additionally operable to communicate the generated trigger to initiate the stopping of the rotary milking platform.

Consequently, various safety arrangements are known for rotary milking parlors, where the arrangements aim at reducing the risk of injuries to humans and/or animals. However, there is room for improvements, especially regarding the reliability and error safety of the safety arrangements.

SUMMARY

The object of the present invention is therefore to offer a safer solution for controlling a rotary milking parlor.

According to one aspect of the invention, the object is achieved by the initially described control system, wherein each sensor in the set of sensors is configured to generate first and second signals for detecting one particular condition. The first and second signals, in turn, are independent from one another. The control system further contains first and second signal lines that are arranged to convey the first and second signals respectively to the central control unit. The rotary milking parlor is only allowed to be operated if both the first and second signals of all sensors in the set of sensors indicate that no entity is deemed to be located at a hazardous position.

This control system is advantageous since the proposed fully doubled sensor arrangement provides a highly robust design. This is especially true in combination with the negative-logic functionality, which exclusively enables operation of the rotary milking parlor if both the first and second signals of all sensors indicate a non-hazardous situation. As described below, this can be implemented by means of a permission signal.

According to one embodiment of this aspect of the invention, said current operation specifically involves moving a platform either in a first or a second direction, where the second direction is opposite to the first direction. Further, each position in a first group of positions is deemed hazardous for the entity if the platform is moved in the first direction, and each position in a second group of positions is deemed hazardous for the entity if the platform is moved in the second direction. Thus, for example, the platform can be reversed if an animal is squeezed while rotating the platform in a forward direction even if one or more sensors are activated. Naturally, this is beneficial both with respect to safety and for practical reasons should it be necessary to empty the platform manually.

According to one embodiment of this aspect of the invention, the control system has at least one input interface configured to generate operator commands for influencing the operation of the rotary milking parlor. The control system also includes a manual control unit connected to the at least one input interface. The manual control unit is configured to control the rotary milking parlor in response to the operator commands and the sensor signals. Thus, as an alternative to the predetermined operation procedure, the rotary milking parlor may also be controlled in response to operator commands.

According to another embodiment of this aspect of the invention, the control system contains control circuitry selectively connectable to the first and second signal lines via a mode-selection member. The central control circuit is configured to enable the rotary milking parlor to operate according to the predetermined operation procedure, if the mode-selection member is set in a first mode of operation. The control circuitry is configured to enable the rotary milking parlor to operate in response to the operator commands, if the mode-selection member is set in a second mode of operation. In both cases, the rotary milking parlor is also operated in response to the sensor signals (i.e. it will be stopped if a hazardous situation arises). Thus, the mode of operation can be conveniently altered between fully automatic and fully manual while maintaining the same high level of safety.

According to yet another embodiment of this aspect of the invention, the control circuitry is configured to produce a permission signal, which is set in an enabling state if and only if both the first and second signals of all sensors in the set of sensors indicate that no entity is deemed to be located at a hazardous position. Further, the manual control unit is configured to: receive the permission signal, receive a mode signal generated via the mode-selection member, and exclusively allow the rotary milking parlor to operate in response to the operator commands if (a) the mode signal indicates that the mode-selection member is set in the second mode of operation and (b) the permission signal is set in the enabling state. Hence, it is ensured that the safety level in the manual mode of operation is equal to that of the automatic mode of operation.

According to still another embodiment of this aspect of the invention, the at least one input interface contains forward- and rearward control input members. Upon activation, the forward-control input member is configured to generate a first operator command; and analogously, the rearward-control input member is configured to generate a second operator command. Moreover, the manual control unit is configured to control a platform of the rotary milking parlor to move in a first direction in response to the first operator command; and conversely, in a second direction opposite to the first direction in response to the second operator command. Nevertheless, the platform will only be controlled to move—in any direction—if: (a) the mode-selection member is set in the second mode of operation, and (b) both the first and second signals of all sensors in the set of sensors indicate that no entity is deemed to be located at a hazardous position. Consequently, the mode-selection member and the forward- and rearward control input members offer the farmer a useful means to operate the rotary milking parlor manually, for example in connection with cleaning, or if the platform must be emptied due to a technical problem.

According to further embodiments of this aspect of the invention, the set of sensors contains one or more sensors specifically configured to: detect the presence of an entity located at a position that is deemed to be hazardous with respect to a stationary object and a current movement direction of the platform; detect the presence of an entity located at a position that is deemed to be hazardous if the platform rotates irrespective of its movement direction; and/or register operator-generated stop commands. Thereby, all potentially dangerous areas of the rotary milking parlor can be surveyed.

According to another aspect of the invention, the object is achieved by a method of controlling a rotary milking parlor, wherein the method involves:

generating, via a set of sensors, sensor signals indicating conditions reflecting whether or not an entity is deemed to be located at a position relative to the rotary milking parlor which position is hazardous for the entity with respect to a current operation of the milking parlor;

controlling the rotary milking parlor according to a pre-determined operation procedure and in response to the sensor signals, where each sensor in the set of sensors is configured to generate first and second signals for detecting one particular condition, and where the first and second signals are independent from one another;

conveying the first and second signals via first and second signal lines respectively; and controlling the rotary milking parlor such that the rotary milking parlor is only allowed to be operated if both the first and second signals of all sensors in the set of sensors indicate that no entity is deemed to be located at a hazardous position.

The advantages of this method, as well as the preferred embodiments thereof, are apparent from the discussion above with reference to the proposed control system.

According to a further aspect of the invention the object is achieved by a computer program loadable into a non-volatile data carrier communicatively connected to a processing unit. The computer program includes software for executing the above method when the program is run on the processing unit.

According to another aspect of the invention the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
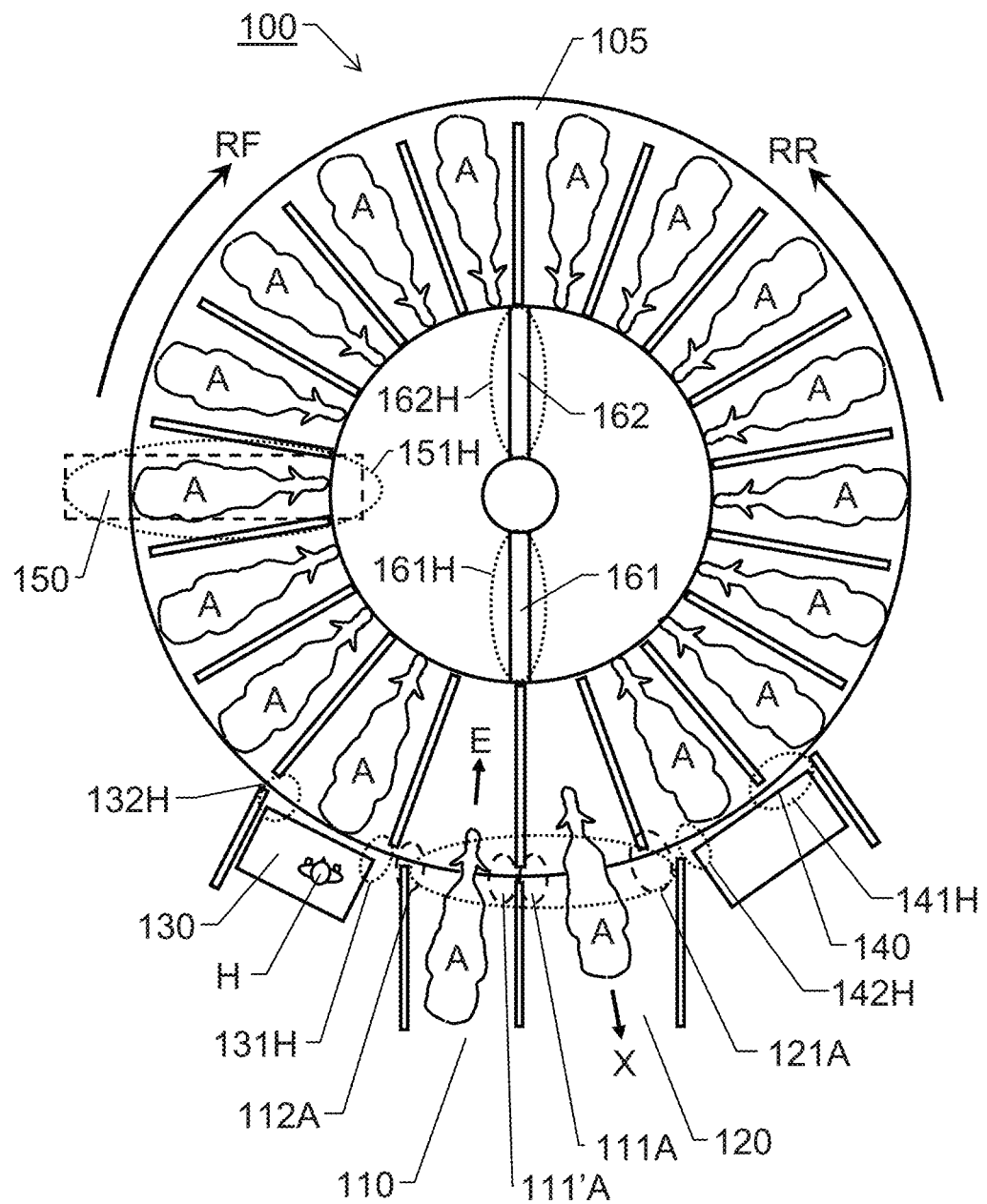
FIG. 1 shows an example of a rotary milking parlor controllable by the proposed control system.
Figure 2:
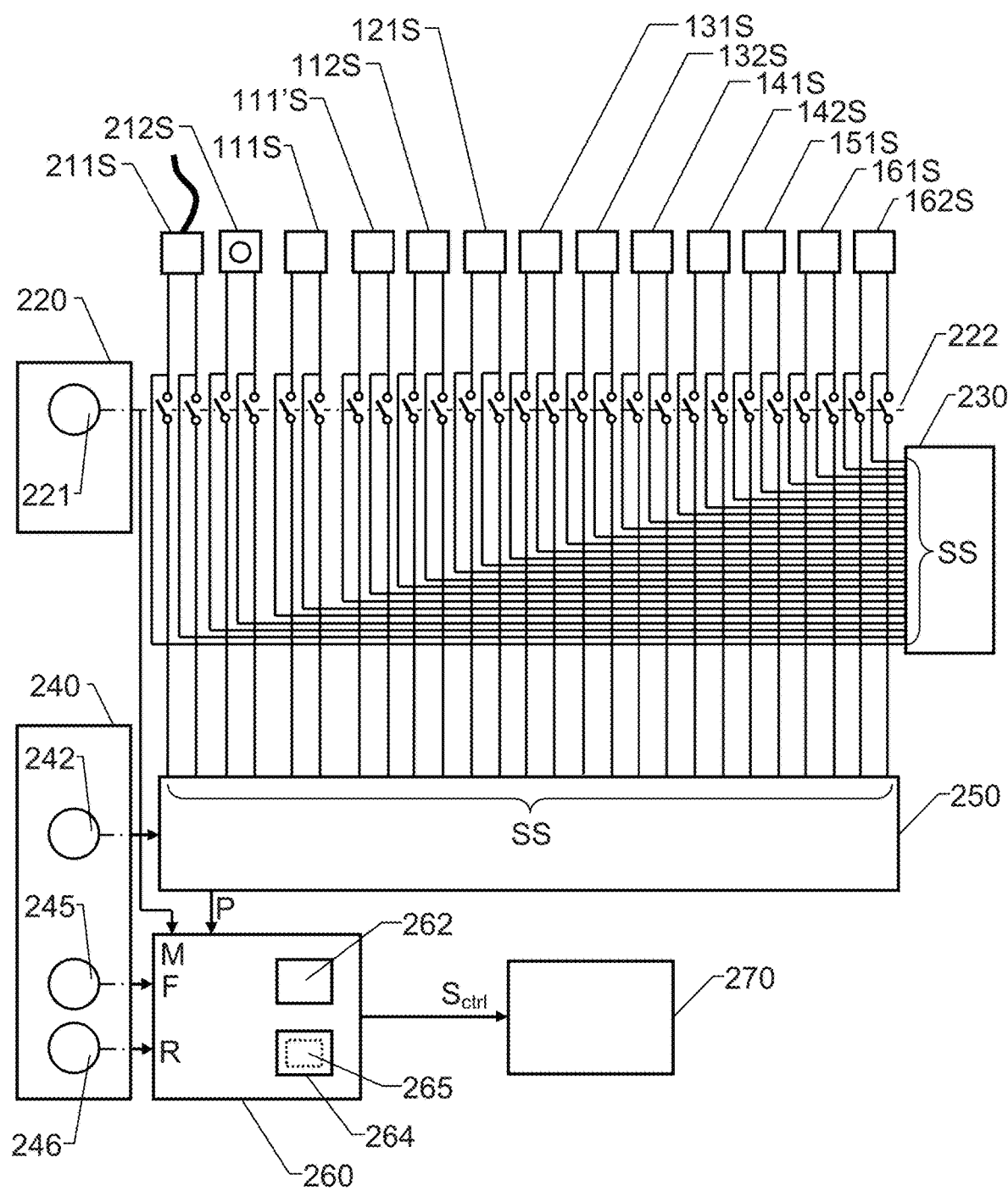
FIG. 2 shows a block diagram over a system according to one embodiment of the invention.

FIG. 1 shows an example of a rotary milking parlor 100 that can be controlled by the present invention, and FIG. 2 shows a block diagram over a system according to one embodiment of the invention.

The rotary milking parlor 100 is associated with an entry zone 110 via which an animal A to be milked can enter E a platform 105 of the parlor 100. The rotary milking parlor 100 is also associated with an exit zone 120, where the animals A leave X the platform 105 after completed milking. Downstream of the entry zone 110 (relative to a forward rotation direction RF) a first operator zone 130 is arranged. The first operator zone 130 enables an operator H to prepare the animal A for the milking and manually attach the teatcups of a milking machine. A second operator zone 140 is arranged upstream of the exit zone 120. Here, an operator H releases the teatcups from the animal A, and performs various post-milking treatments. The platform 105 usually has an annular design, and it may be connected to a central axle via arms 161 and 162 respectively. Moreover, a passageway 150 can be provided under the platform 105 to enable operator access to an area around the central axle, the so-called pit.

In FIG. 1, potentially hazardous areas 111A, 111'A, 112A, 121A, 131H, 132H, 141H, 142H, 151H, 161H and 162H are illustrated, where an operator H and/or an animal A risk being injured if they are unfortunately located relative to the rotary milking parlor 100 and its current operation. For instance, if the platform 105 moves in the forward rotation direction RF, an animal A exiting X too slowly from its bail risk being squeezed in an area 111A. Similarly, an animal A entering E too slowly into a bail from the entry zone 110 risk being squeezed in an area 112A.

Further, in the forward rotation direction RF, operators H risk being squeezed in areas 132H and 142H respectively at railings adjoining the platform 105. Furthermore, if the platform 105 moves in a rearward rotation direction RR, animals A risk being squeezed in areas 111'A, 121A, 131A and operators risk being squeezed in areas 131H and 142H respectively. Additionally, there are zones that are hazardous to operators H regardless of the movement direction of the platform 105, namely an area 151H encompassing the passageway 150 and areas 161H and 162H near the arms 161 and 162 respectively.

The potentially hazardous areas 111A, 111'A, 112A, 121A, 131H, 132H, 141H, 142H, 151H, 161H and 162H are monitored via a set of sensors 111S, 111'S, 112S, 121S, 131S, 132S, 141S, 142S, 151S, 161S and 162S respectively. More precisely, the set of sensors 111S, 112S, 121S, 131S, 132S, 141S, 142S, 151S, 161S and 162S may include at least one first sensor 111S, 111'S, 112S, 121S, 131S, 132S, 141S and/or 142S (e.g. of pressure, photo-cell or ultrasonic type) configured to detect the presence of an entity A or H being located at a position 111A, 111'A, 112A, 121A, 131H, 132H, 141H or 142H respectively deemed to be hazardous with respect to a stationary object and a current movement direction RF or RR of the rotary milking parlor 100. This means that one or more of the sensors may have a direction-dependent area of sensitivity.

Additionally, the set of sensors 111S, 111'S, 112S, 121S, 131S, 132S, 141S, 142S, 151S, 161S and 162S preferably includes at least one sensor (e.g. of pressure, photo-cell, or ultrasonic type) 150S, 161S and/or 162S that is configured to detect the presence of an entity, typically an operator H, being located at a position 151H, 161H or 162H respectively deemed to be hazardous if the rotary milking parlor 100 is operated irrespective of its movement direction.

Further, FIG. 2 shows sensors 211S and 212S configured to register operator-generated stop commands, for example by pulling an attached rope or manipulating a push button, i.e. various means through which a user may actively stop the operation of the rotary milking parlor 100.

Each of the sensors in the set of sensors 211S, 212S, 111S, 111'S, 112S, 121S, 131S, 132S, 141S, 142S, 151S, 161S and 162S is configured to detect one particular condition and generate a pair of mutually independent sensor signals SS reflecting this condition. In FIG. 2, these signals are illustrated by respective first and second signal lines, which are arranged to convey the first and second signals to a central control unit 230.

Specifically, the sensors 111S, 111'S, 112S, 121S, 131S, 132S, 141S, 142S, 151S, 161S and 162S indicate conditions reflecting whether or not an entity, i.e. an animal A or an operator H, is deemed to be located within a detection area, i.e. at a position 111A, 111'A, 112A, 121A, 131H, 132H, 141H, 142H, 151H, 161H, 162H relative to the rotary milking parlor 100 which position is hazardous for the entity A and/or H with respect to a current operation of the milking parlor 100.

The central control unit 230 is configured control the rotary milking parlor 100 according to a predetermined operation procedure, which for example may be defined by a computer program and/or a logic circuitry. The central control unit 230 also receives the sensor signals SS via the first and second signal lines, and the central control unit 230 is further configured to control the rotary milking parlor 100 in response to the sensor signals SS. Namely, the central control unit 230 only allows the rotary milking parlor 100 to be operated if both the first and second signals of all sensors in the set of sensors 211S, 212S, 111S, 111'S, 112S, 121S, 131S, 132S, 141S, 142S, 151S, 161S and 162S indicate that no entity A or H is deemed to be located at a hazardous position relative to a current operation of the rotary milking parlor 100.

Typically, operating the rotary milking parlor 100 involves moving a platform 105 in a first direction RF or a second direction RR, which is opposite to the first direction RF. Here, different positions are deemed hazardous depending on the direction in which the platform 105 is moved. More precisely, each position in a first group of positions 111A, 112A, 132H and 142H is deemed hazardous for the entity A or H respectively if the platform 105 is moved in the first direction RF. Analogously, each position in a second group of positions 111'A, 121A, 131H and 141H is deemed hazardous for the entity A or H respectively if the platform 105 is moved in the second direction RR. Namely, when moving the platform 105 in the first direction RF, the entity A or H risk being squeezed against a first set of objects, and when moving the platform 105 in the second direction RR, the entity A or H risk being squeezed against a second set of objects.

Consequently, it is advantageous if entitles A and/or H are allowed to be located at any of the second group of positions 111'A, 121A, 131H and 141H when moving the platform 105 in the first direction RF, and if entities A and/or H are allowed to be located at any of the first group of positions 111A, 112A, 132H and 142H when moving the platform 105 in the second direction RR, so that an entity can be freed from a possible squeezing position.

Preferably, the control system also includes at least one input interface. FIG. 2 shows two such interfaces 220 and 240 respectively that are configured to generate operator commands for influencing the operation of the rotary milking parlor 100. Here, a first input interface 220 includes a mode-selection member 221 configured to jointly open or close a set of relays 222. More precisely, the first input interface 220 is arranged so that manipulation of the mode-selection member 221 causes the sensor signals SS to be fed either to the central control unit 230 only, or to the central control unit 230 and a manual control unit 260. In the embodiment of FIG. 2, a control circuitry 250 is arranged as an interface to the manual control unit 260. The control circuitry 250 collects the sensor signals SS and produces a permission signal P to the manual control unit 260 as will be described below.

The manual control unit 260 is connected to a second input interface 240 (however, naturally, according to the invention, the first and second interfaces 220 and 240 may equally well be integrated into a common unit). The manual control unit 260 is configured to control the rotary milking parlor 100 in response to the operator commands F and R respectively as well as in response to the sensor signals SS. This means that the manual control unit 260 only allows the rotary milking parlor 100 to be operated as instructed by the operator commands F and R if both the first and second signals of all sensors in the set of sensors 211S, 212S, 111S, 111'S, 112S, 121S, 131S, 132S, 141S, 142S, 151S, 161S and 162S indicate that no entity A or H is deemed to be located at a hazardous position.

To enable convenient shifting between automatic and manual operation of the rotary milking parlor 100, the control circuitry 250 is preferably selectively connectable to the first and second signal lines via the mode-selection member 221. Thereby, if the mode-selection member 221 is set in a first mode of operation, the central control unit 230 can be arranged to enable the rotary milking parlor 100 to operate according to the predetermined operation procedure (i.e. automatically) and in response to the sensor signals SS; and if the mode-selection member 221 is set in a second mode of operation, via the permission signal P from the control circuitry 250, the manual control unit 260 can be arranged to enable the rotary milking parlor 100 to operate in response to the operator commands F/R and in response to the sensor signals SS.

The control circuitry 250 is configured to produce the permission signal P, which is set in an enabling state if and only if both the first and second signals of all sensors in the set of sensors 211S, 212S; 111S, 111'S, 112S, 121S, 131S, 132S, 141S, 142S, 151S, 161S and 162S indicate that no entity A or H is deemed to be located at a hazardous position. Thus, the manual control unit 260 is configured to: receive the permission signal P, receive a mode signal M generated via the mode-selection member 221 (the mode signal reflecting a selected mode setting), and exclusively allow the rotary milking parlor 100 to operate in response to the operator commands F/R if the mode signal M indicates that the mode-selection member 221 is set in the second mode of operation and the permission signal P is set in the enabling state.

The operator commands F/R, in turn, are preferably generated via an operator interface. In the embodiment of FIG. 2, the second interface 240 represents such an interface. Here, a forward-control input member 245 is configured to generate a first operator command F upon activation; and a rearward-control input member 246 is configured to generate a second operator command R upon activation. Moreover, via a control signal $S_{ctrl}$, the manual control unit 260 is configured to control the rotary milking parlor 100 to move in a first direction RF, say forward/clockwise, in response to the first operator command F, if the mode-selection member 221 is set in the second mode of operation (as indicated by the mode signal M) and both the first and second signals of all sensors in the set of sensors 211S, 2128, 111S, 111'S, 112S, 121S, 131S, 132S, 141S, 142S, 151S, 161S and 162S indicate that no entity A or H is deemed to be located at a hazardous position. Analogously, also via the control signal $S_{ctrl}$, the manual control unit 260 is configured to control the rotary milking parlor 100 to move in a second direction RR, say rearward/counter-clockwise, in response to the second operator command R, if the mode-selection member 221 is set in the second mode of operation (as indicated by the mode signal M) and both the first and second signals of all sensors in the set of sensors 211S, 212S, 111S, 111'S, 112S, 121S, 131S, 132S, 141S, 142S, 151S, 161S and 162S indicate that no entity A or H is deemed to be located at a hazardous position.

It is generally advantageous if the central control unit 230 and the manual control unit 260 are configured to effect the above-described procedure in a fully automatic manner, for instance by executing a computer program. Therefore, said control units are preferably communicatively connected to a memory unit storing a computer program, which, in turn, contains software for making at least one processor in the control units 230 and 260 respectively execute the above-described actions when the computer program is run on the at least one processor.

Figure 3:
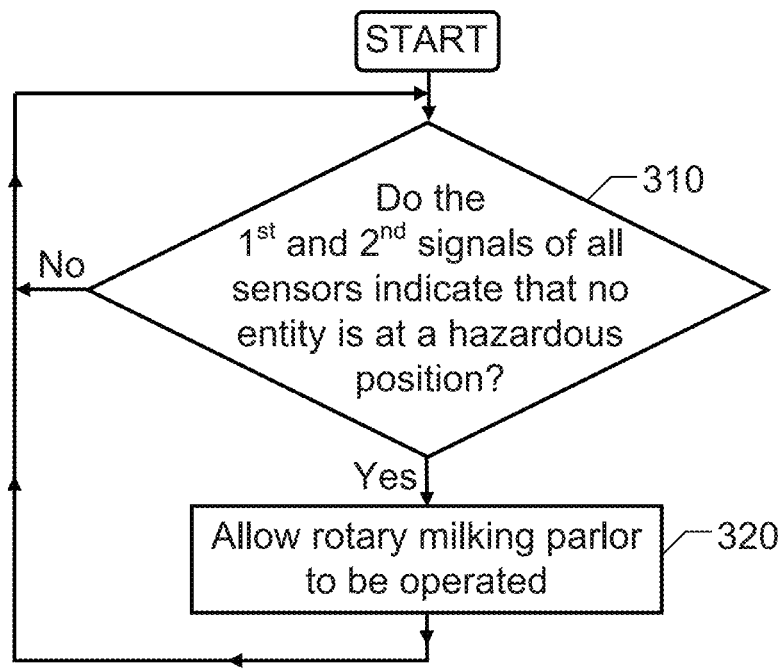
FIGS. 3-4 illustrate, by means of flow diagrams, the general method according to the invention and a method according to one embodiment thereof respectively.

In order to sum up, and with reference to the flow diagram in FIG. 3, we will now describe the general method according to the invention of controlling a rotary milking parlor 100.

In a first step 310, it is checked if both the first and second signals of all sensors in the set of sensors indicate that no entity is deemed to be located at a hazardous position. If affirmative, i.e. if no hazard is detected to any human or animal, a step 320 follows, and otherwise the procedure loops back and stays in step 310.

In step 320, the rotary milking parlor 100 is allowed to be operated, either automatically according to a predetermined operation procedure, or manually (in a forward or rearward direction). Subsequently, the procedure loops back to step 310. Thus, in practice, the conditions of step 310 are checked repeatedly; and if and only if no hazard is detected, operation of the rotary milking parlor 100 is enabled.

Figure 4:
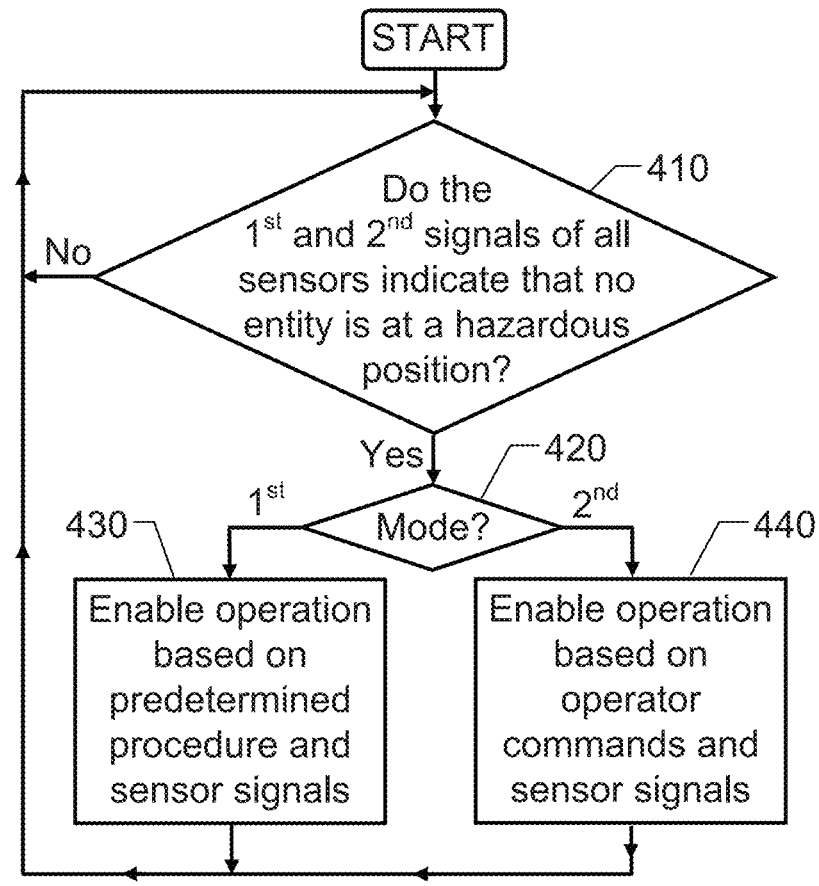

The flow diagram of FIG. 4 illustrates a method according to one embodiment of the invention. Here, a first step 410 is identical to the above-described step 310. Given an affirmative response in step 410, a step 420 follows which checks whether the mode-selection member 221 is set in the first or second mode of operation. In the former case, the procedure continues to a step 430, and otherwise a step 440 follows.

In step 430, operation of the rotary milking parlor 100 is enabled according to a predetermined operation procedure and in response to the sensor signals. In step 440, operation of the rotary milking parlor 100 is enabled according to in response to the operator commands and in response to the sensor signals.

After steps 430 and 440, the procedure loops back to step 410 for a repeated check on whether an entity is deemed to be located at a hazardous position. Hence, the conditions of step 410 are checked recurrently; and if and only if no hazard is detected, operation of the rotary milking parlor 100 is enabled.

All of the process steps, as well as any sub-sequence of steps, described with reference to FIGS. 3 and 4 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A control system for a rotary milking parlor (100), the control system comprising:
   a set of sensors, each sensor of said sensors configured to generate first and second sensor signals (SS) indicating a condition reflecting whether or not an entity is located at a position relative to the rotary milking parlor (100) that is hazardous for the entity (A, H) with respect to a current operation (RF, RR) of the milking parlor (100);
   a central control unit (230) configured to receive said first and second sensor signals, and to control the rotary milking parlor (100) in response to said first and second sensor signals and according to a predetermined operation procedure,
   each sensor in the set of sensors configured such that said first and second signals are independent from one another and are conveyed separately from each sensor by respective first and second signal lines that separately convey said first and second signals from each sensor to the central control unit (230), and
   the central control unit configured to permit the rotary milking parlor (100) to be operated only on condition that both said first and second signals of all the sensors in the set of sensors indicate that no entity (A, H) is located at any hazardous position;
   at least one input interface (220, 240) configured to generate operator commands (F, R) for influencing the operation of the rotary milking parlor (100);
   a manual control unit (260) connected to the at least one input interface (240), the manual control unit (260) being configured to control the rotary milking parlor (100) in response to the operator commands (F, R) and said first and second sensor signals; and
   control circuitry (250) selectively connectable to the first and second signal lines via a mode-selection member (221),
   the central control unit (230) being configured to enable the rotary milking parlor (100) to operate according to the predetermined operation procedure and in response to said sensor signals if the mode-selection member (221) is set in a first mode of operation, and
   the control circuitry (250) being configured to enable the rotary milking parlor (100) to operate in response to the operator commands (F, R) and in response to said sensor signals if the mode-selection member (221) is set in a second mode of operation.

2. The control system according to claim 1, wherein:
   the current operation comprises moving a platform (105) in one of a first direction (RF) and a second direction (RR) opposite to the first direction (RF),
   each position in a first group of positions is defined as hazardous for the entity (A, H) if the platform (105) is moved in the first direction (RF), and
   each position in a second group of positions is defined as hazardous for the entity (A, H) if the platform (105) is moved in the second direction (RR).

3. The control system according to claim 1, wherein:
   the control circuitry (250) is configured to produce a permission signal (P) which is set in an enabling state if and only if both the first and second signals of all sensors in the set of sensors indicate that no entity (A, H) is located at any hazardous position, and
   the manual control unit (260) is configured to:
     receive the permission signal (P),
     receive a mode signal (M) generated via the mode-selection member (221), and
     exclusively allow the rotary milking parlor (100) to operate in response to the operator commands (F, R) if the mode signal (M) indicates that the mode-selection member (221) is set in the second mode of operation and the permission signal (P) is set in the enabling state.

4. The control system according to claim 1, wherein:
   the at least one input interface (220, 240) comprises a forward-control input member (245) configured to, upon activation, generate a first operator command (F) of said operator commands, and a rearward-control input member (246) configured to, upon activation, generate a second operator command (R) of said operator commands, and
   the manual control unit (260) is configured to:
     control ($S_{ctrl}$) a platform (105) to move in a first direction (RF) in response to the first operator command (F), if the mode-selection member (221) is set in the second mode of operation and both the first and second signals of all sensors in the set of sensors indicate that no entity (A, H) is located at any hazardous position, and
     control ($S_{ctrl}$) the platform (105) to move in a second direction (RR) opposite to the first direction (RF) in response to the second operator command (R), if the mode-selection member (221) is set in the second mode of operation and both the first and second signals of all sensors in the set of sensors indicate that no entity (A, H) is located at any hazardous position.

5. The control system according to claim 1, wherein the set of sensors comprises at least one of:
   a first sensor configured to detect the presence of an entity (A, H) being located at a first position that is hazardous with respect to a stationary object and a current movement direction (RF, RR) of a platform (105) of the rotary milking parlor (100); and
   a second sensor configured to detect the presence of an entity (H) being located at a second position that is hazardous if the rotary milking parlor is operated irrespective of a movement direction of the platform (105).

6. The control system according to claim 1, wherein the set of sensors comprises at least one sensor (211S, 212S) configured to register operator-generated stop commands.

7. A method of controlling a rotary milking parlor (100), the method comprising:
   generating, via a set of sensors, first and second sensor signals (SS), both indicating conditions reflecting whether or not an entity (A, H) is located at positions relative to the rotary milking parlor (100) that are hazardous for the entity (A, H) with respect to a current operation (RF, RR) of the milking parlor (100);

controlling the rotary milking parlor (100) according to a predetermined operation procedure and in response to said first and second sensor signals, each sensor in the set of sensors configured to generate both said first and second signals for indicating a condition reflecting whether or not an entity is located at one of the hazardous positions, said first and second signals being independent from one another;

conveying said first and second signals separately via respective first and second signal lines;

controlling the rotary milking parlor (100) such that the rotary milking parlor (100) operates only on condition that both said first and second signals of all the sensors in the set of sensors indicate that no entity (A, H) is located at any hazardous position;

generating operator commands (F, R) via at least one input interface (220, 240), the operator commands (F, R) being configured to influence the operation of the rotary milking parlor (100);

controlling the rotary milking parlor (100) in response to the operator commands (F, R) and said first and second sensor signals;

enabling the rotary milking parlor (100) to operate according to the predetermined operation procedure and in response to said first and second sensor signals in a first mode of operation; and enabling the rotary milking parlor (100) to operate in response to the operator commands (F, R) and in response to said first and second sensor signals in a second mode of operation.

8. The method according to claim 7, wherein:
the current operation comprises moving a platform (105) in one of a first direction (RF) and a second direction (RR) opposite to the first direction (RF), each position in a first group of positions is deemed hazardous for the entity (A, H) if the platform (105) is moved in the first direction (RF), and each position in a second group of positions is deemed hazardous for the entity (A, H) if the platform (105) is moved in the second direction (RR).

9. The method according to claim 7, further comprising:
producing a permission signal (P) set in an enabling state if and only if both the first and second signals of all sensors in the set of sensors indicate that no entity (A, H) is located at any hazardous position;

checking if the permission signal (P) is set in the enabling state;

checking a mode of operation indicated by a mode signal (M); and allowing the rotary milking parlor (100) to operate in response to the operator commands (F, R) exclusively if the mode signal (M) indicates the second mode of operation and the permission signal (P) is set in the enabling state.

10. The method according to claim 9, further comprising:
controlling ($S_{ctrl}$) a platform (105) of the rotary milking parlor (100) to move in a first direction (RF) in response to a forward-control input member (245) being activated to generate a first operator command (F) of said operator commands, if the mode signal (M) indicates the second mode of operation, and if both the first and second signals of all sensors in the set of sensors indicate that no entity (A, H) is located at any hazardous position; and controlling ($S_{ctrl}$) the platform (105) to move in a second direction (RR) opposite to the first direction (RF) in response to a rearward-control input member (246) being activated to generate a second operator command (R) of said operator commands, if the mode signal (M) indicates the second mode of operation, and both the first and second signals of all sensors in the set of sensors indicate that no entity (A, H) is deemed to be located at any hazardous position.

11. A non-volatile, non-transitory data recording medium having stored thereon a computer program (265) comprising software that, upon execution by a processing unit (262) causes the processing unit (262) to execute the method according to claim 7.

* * * * *